(12) United States Patent
Sakata et al.

(10) Patent No.: US 7,924,560 B2
(45) Date of Patent: Apr. 12, 2011

(54) DISPLAY DEVICE

(75) Inventors: Tatsuya Sakata, Tokyo (JP); Makoto Miyashita, Tokyo (JP); Toyoki Takahashi, Kanagawa (JP); Daiki Adachi, Kanagawa (JP); Sachiko Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/125,191

(22) Filed: May 22, 2008

(65) Prior Publication Data

US 2008/0291614 A1 Nov. 27, 2008

(51) Int. Cl.
*G06F 1/20* (2006.01)

(52) U.S. Cl. ............. 361/679.46; 361/679.22; 361/690; 361/702; 361/719; 165/80.2; 174/15.2

(58) Field of Classification Search .................. 361/681, 361/679.21, 679.22, 679.46–679.54, 690, 361/719, 694–695, 702; 165/80.2–80.5, 165/104.33, 185; 174/15.2, 16.1, 16.3
See application file for complete search history.

(56) References Cited

U.S. PATENT DOCUMENTS

| | | | | |
|---|---|---|---|---|
| 5,150,198 A * | 9/1992 | Ohikata et al. | ................ | 257/713 |
| 6,549,404 B1 * | 4/2003 | Kitahara et al. | ............... | 361/695 |
| 6,621,698 B2 * | 9/2003 | Chang | ...................... | 361/679.47 |
| 6,900,990 B2 * | 5/2005 | Tomioka | ....................... | 361/752 |
| 7,031,155 B2 * | 4/2006 | Sauciuc et al. | ................ | 361/695 |
| 7,289,172 B2 * | 10/2007 | Kojima et al. | ................... | 349/58 |
| 7,339,787 B2 * | 3/2008 | Cheng et al. | .................... | 361/695 |
| 7,405,937 B1 * | 7/2008 | Wang et al. | .................... | 361/700 |
| 7,532,470 B2 * | 5/2009 | Ariga | ............................ | 361/695 |
| 2006/0187801 A1 * | 8/2006 | Nishidate et al. | ............. | 369/125 |
| 2006/0268527 A1 * | 11/2006 | Tanaka et al. | ................. | 361/722 |
| 2007/0102795 A1 * | 5/2007 | Aoki et al. | ..................... | 257/675 |
| 2007/0133174 A1 * | 6/2007 | Mikami et al. | ................ | 361/700 |

FOREIGN PATENT DOCUMENTS

JP  2002-076664  3/2002

* cited by examiner

*Primary Examiner* — Lisa Lea-Edmonds
*Assistant Examiner* — Ingrid Wright
(74) *Attorney, Agent, or Firm* — Finnegan, Henderson, Farabow, Garrett & Dunner, L.L.P.

(57) ABSTRACT

A display device of the present invention is a display device including a body unit; a display unit; and a supporting unit, arranged upright from the body unit, for supporting the display unit; the display device including a circuit substrate arranged inside the body unit and mounted with an electronic component; a radiator plate arranged facing the circuit substrate and directly or indirectly contacting a plurality of electronic components; a heat pipe arranged on the radiator plate; and a cooling fan attached to the radiator plate and connected with a terminating end of the heat pipe.

11 Claims, 14 Drawing Sheets

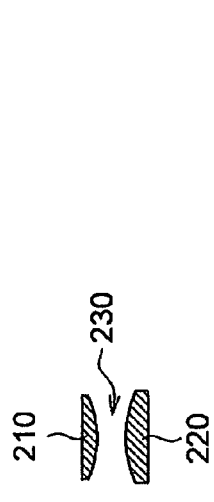
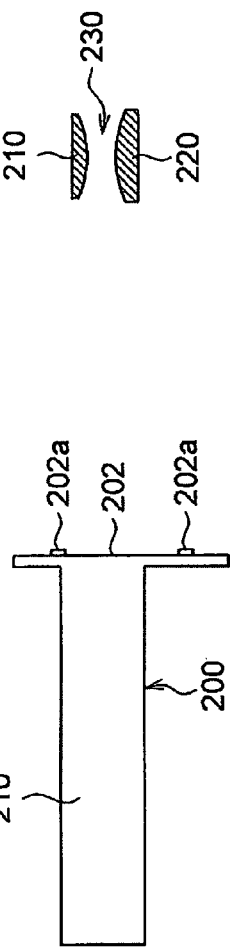
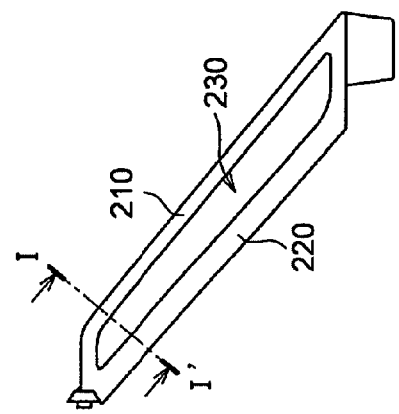
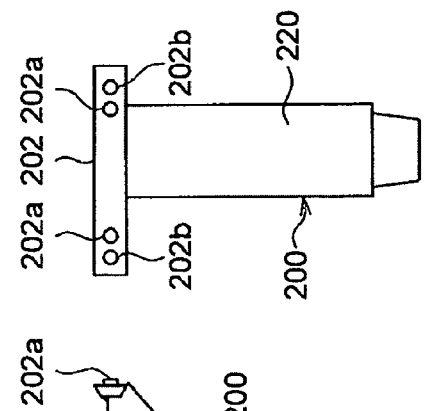
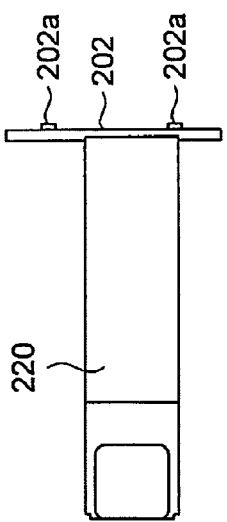
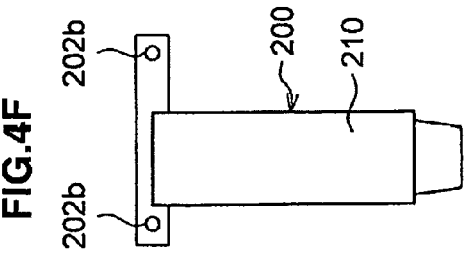

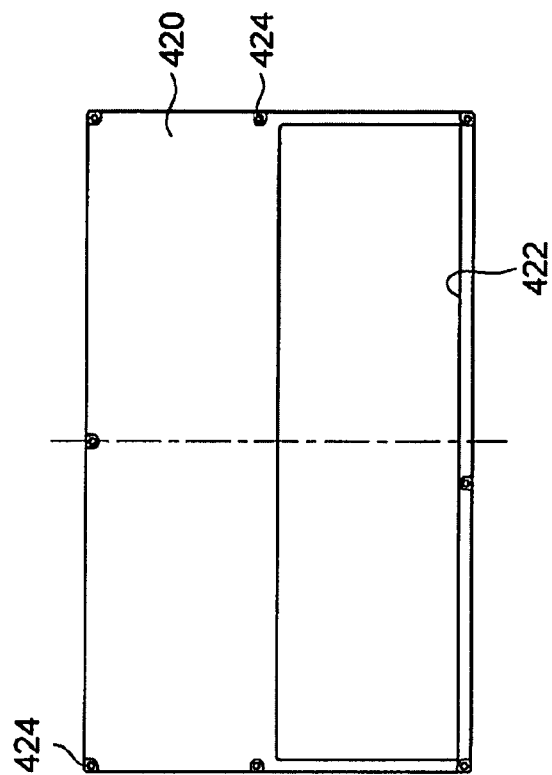
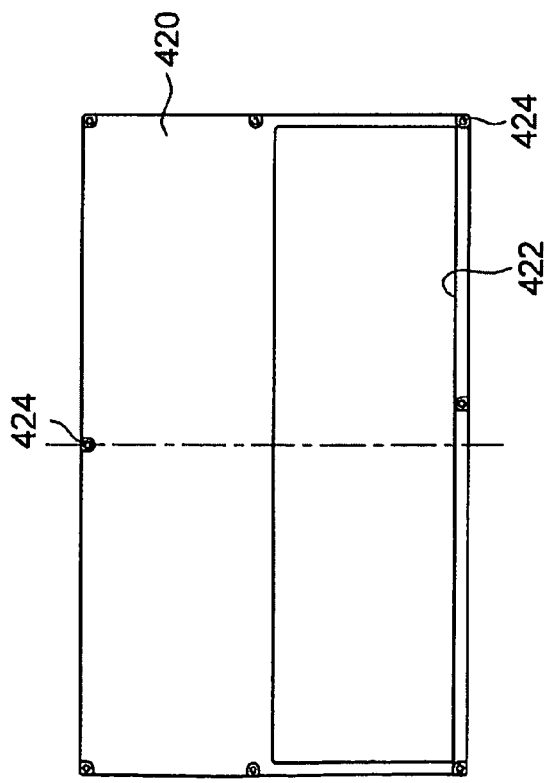

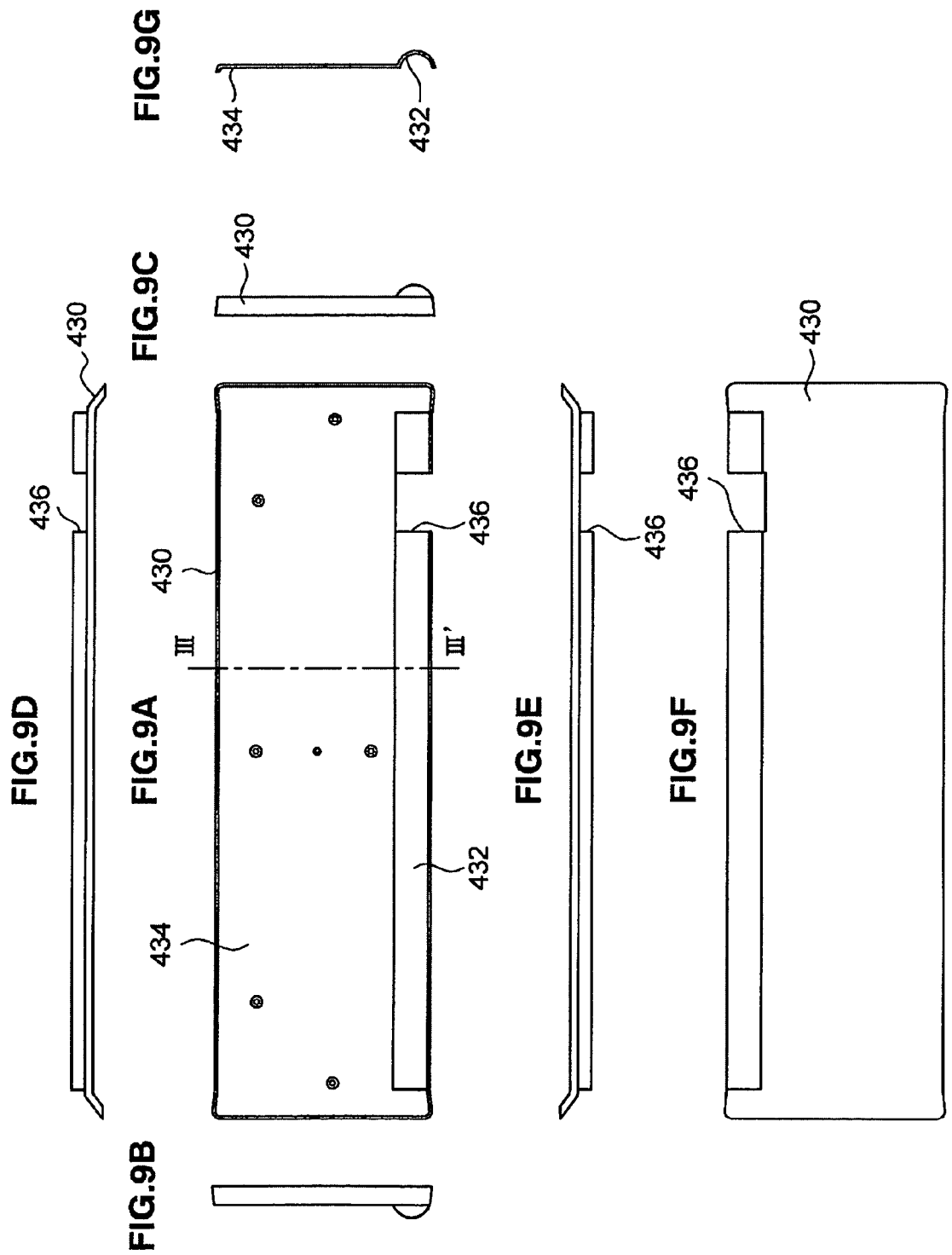

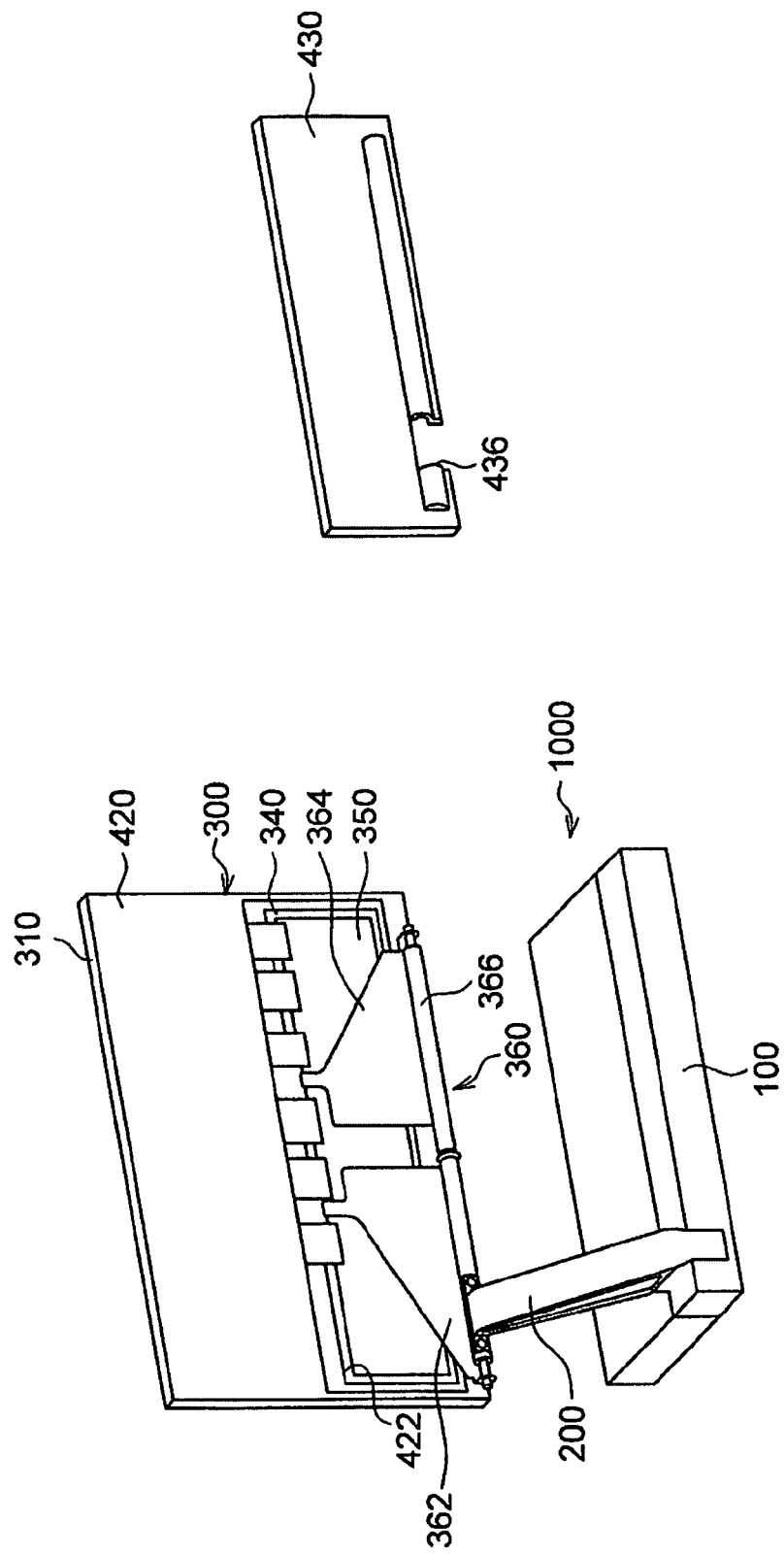

DISPLAY DEVICE

CROSS REFERENCES TO RELATED APPLICATIONS

The present invention contains subject matter related to Japanese Patent Application JP 2007-137115 filed in the Japan Patent Office on May 23, 2007, the entire contents of which being incorporated herein by reference.

BACKGROUND OF THE INVENTION

1. Field of the Invention

The present invention relates to a display device.

2. Description of the Related Art

Conventionally, in personal computers and the like, the heat generated from a specific electronic component is transferred to the heat radiation cooling fan using a heat pipe and radiated in order to suppress heat generation of the electronic component arranged inside the body.

SUMMARY OF THE INVENTION

However, in a display device of a small television receiver, a great number of electronic components are arranged inside the body in a packed state, and each electronic component individually generates heat, and thus a great number of heat generating components coexist. Inside the body. In such case, the arrangement of the heat pipe becomes complex when attempting to radiate the generated heat, of each electronic component, and efficient heat radiation becomes difficult. Thus, the temperature inside the body of the display device easily rises particularly in a small television receiver etc.

The present invention addresses the above-identified problems, and it is desirable to provide a novel and an improved display device capable of efficiently radiating heat generated from the electronic component.

According to an embodiment of the present invention; there is provided a display device including a body unit; a display unit; and a supporting unit, arranged upright from the body unit, for supporting the display unit; the display device including a circuit substrate arranged inside the body unit and mounted with an electronic component; a radiator plate arranged facing the circuit substrate and contacting a plurality of electronic components on the circuit substrate; a heat pipe arranged on the radiator plate; and a cooling fan attached to the radiator plate and connected with a terminating end of the heat pipe.

According to such configuration, the display unit is supported by the supporting unit arranged upright from the body unit. The circuit substrate mounted with an electronic component is arranged inside the body unit, and the radiator plate is arranged facing the circuit substrate and contacting a plurality of electronic components on the circuit substrate. The heat pipe is arranged on the radiator plate, and the cooling fan connected with the terminating end of the heat pipe is attached to the radiator plate. Therefore, heat generated from the plurality of electronic components on the circuit, substrate is sent to the heat pipe through the radiator plate, and heat transferred to the cooling fan. Thus, even if a great number of heat generating components coexist in the body unit, heat transfer is reliably performed through the radiator plate and the heat pipe, and heat radiation of the body unit can be efficiently performed.

Furthermore, the radiator plate may include a plurality of concave surfaces or convex surfaces, and contacts the plurality of electronic components having different heights from a surface of the circuit substrate at positions of the concave surfaces or convex surfaces. According to such configuration, a plurality of concave surfaces or convex surfaces are formed on the radiator plate, and thus the plurality of electronic components having different heights from the surface of the circuit substrate can be contacted to the radiator plate, and heat radiation from the plurality of electronic components having different shapes can be reliably performed.

Moreover, the heat pipe may be arranged in a region not formed with the concave surface or convex surface on the radiator plate. According to such configuration, the structure can be simplified since the shape of the heat pipe is not restricted by the concave surface or the convex surface, and the manufacturing cost of the radiator plate arranged with the heat pipe can be reduced.

At least two circuit substrates are arranged, the radiator plate being arranged between the adjacent circuit substrates; wherein the radiator plate directly or indirectly contacts the electronic components mounted on both circuit substrates arranged adjacent to each other. According to such configuration, heat generated from at least two circuit substrates arranged adjacent to each other can be reliably radiated with one radiator plate.

A potential of the radiator plate may be a ground potential. According to such configuration, the influence of noise on the circuit substrate can be reliably reduced.

The heat pipe may be arranged along a region where heat divergence from the electronic component is large compared to the surrounding. According to such configuration, heat generated in a region of large heat divergence can be efficiently heat transferred with the heat pipe.

The radiator plate may contact the electronic component by way of a heat conductive sheet. According to such configuration, the generated heat of the electronic component can be reliably transmitted to the radiator plate through the heat conductive sheet.

According to the embodiments of the present invention, a display device capable of efficiently radiating heat generated form the electronic component is provided.

BRIEF DESCRIPTION OF THE DRAWINGS

FIGS. 4A to 4G are frame format views showing a configuration of the arm unit in detail;

FIGS. 8A and 8B are frame format views showing a configuration of a rear cover;

FIGS. 9A to 9G are frame format views showing a configuration of a T-cover;

FIG. 10 is a frame format view showing a state of the display device seen from the rear surface side with the T-cover detached;

DETAILED DESCRIPTION OF THE PREFERRED EMBODIMENTS

Figure 1:
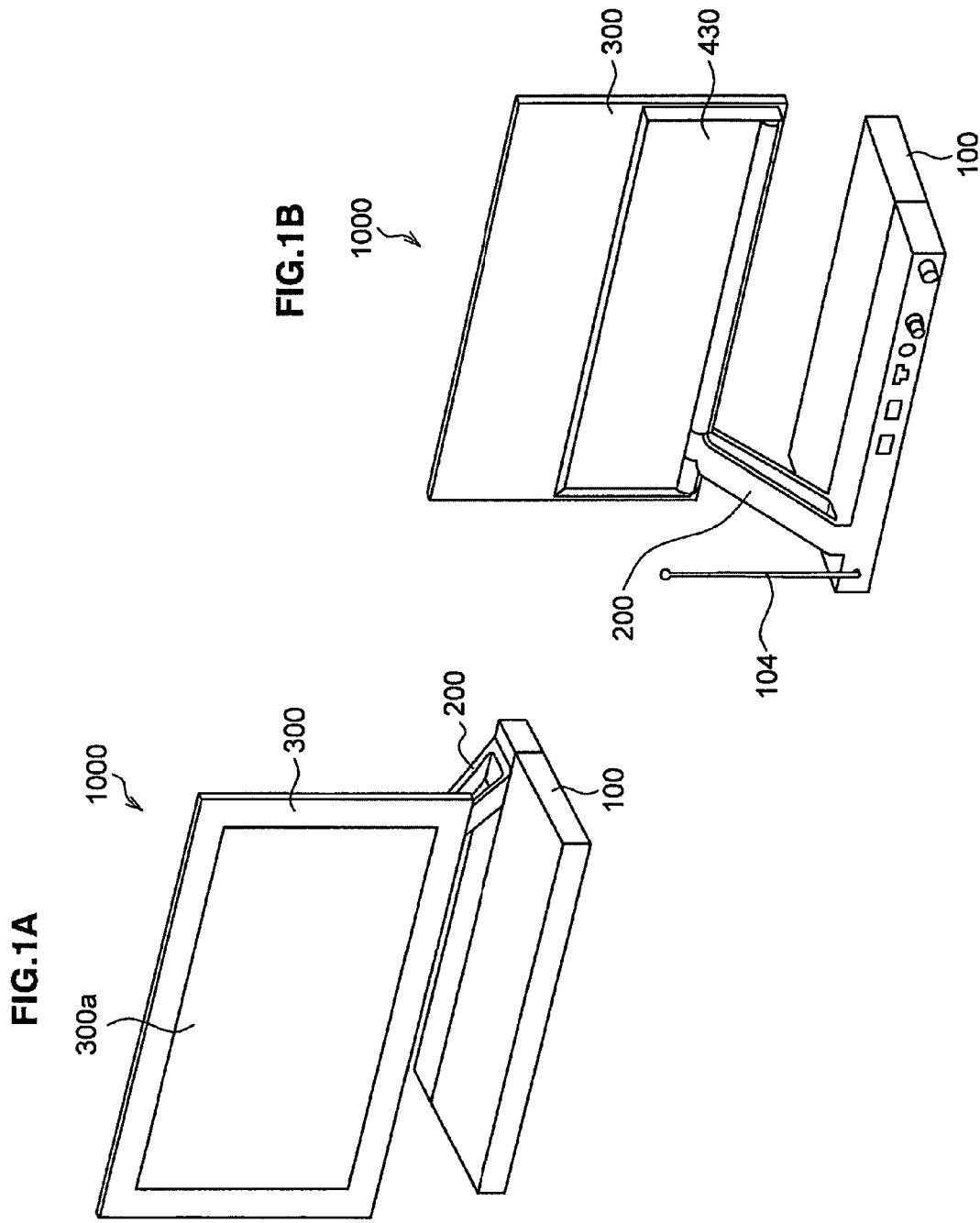
FIGS. 1A and 1B are schematic perspective views showing an outer appearance of a display device according to one embodiment of the invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Overall Configuration of Display Device]

Figure 2:
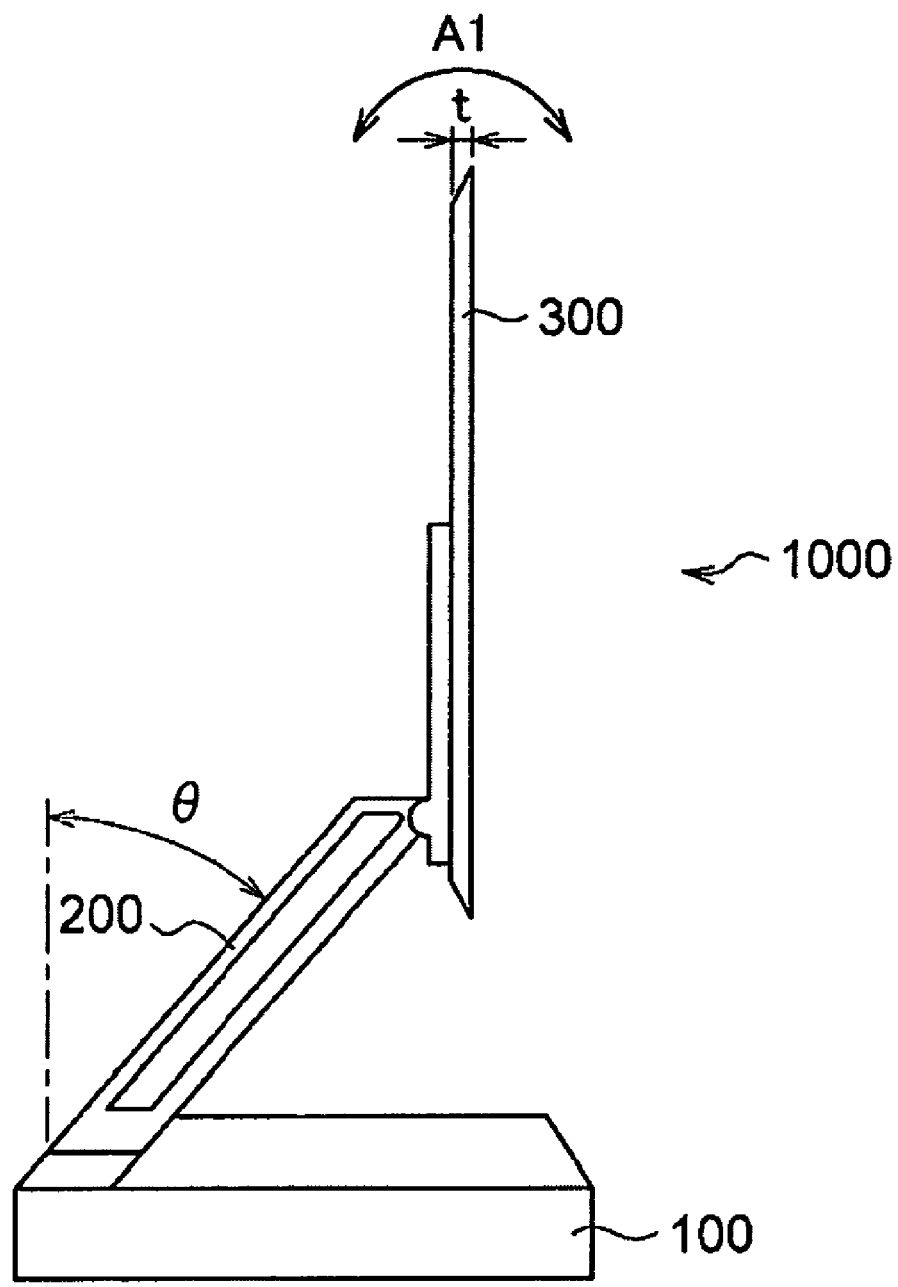
FIG. 2 is a schematic perspective view showing the display device seen from the left on the front surface side.

FIGS. 1A and 1B are schematic perspective views showing an outer appearance of a display device 1000 according to one embodiment of the present invention, FIG. 1A is a schematic perspective view showing the display device 1000 seen from the upper right on the front surface side. FIG. 1B is a perspective view showing the display device 1000 seen from the upper right on the back surface side of the display device 1000. FIG. 2 is a schematic perspective view showing the display device 1000 seen from the left on the front surface side.

As shown in FIGS. 1A, 1B, and 2, the display device 1000 of the present, embodiment is configured to include a body stand unit (body unit) 100, an arm unit (supporting unit) 200, and a display displaying unit (display unit) 300. The display device 1000 receives television broadcast pictures etc., and displays the same on a display screen 300a of the display displaying unit 300.

The display displaying unit 300 includes a display panel (organic EL (electro luminescence) panel) 320 for displaying images using organic EL phenomenon. The organic EL panel 320 is configured to include a plurality of organic EL elements, which are self-emitting elements, and does not include configurations such as backlight, and thus the thickness thereof can be made sufficiently thin. As shown in FIG. 2, the display displaying unit 300 of the present embodiment is a thin panel having a very thin thickness, the thickness t being suppressed to less than or equal to about a few mm (about 3 mm).

The arm unit 200 is arranged at one location on the back side of the body stand unit 100 and is arranged standing upward from the body stand unit 100. The arm unit 200 is arranged more to the right side than the center in the transverse direction (horizontal direction) of the body stand unit 100 when the display device 1000 is seen from the front surface side, and is connected on the right side than the center in the transverse direction of the display displaying unit 300. Thus, in the display device 1000 of the present embodiment, the arm unit 200 is arranged on one of the left or the right side from the center in the horizontal direction of the display displaying unit 300, and the display displaying unit 300 is supported in a cantilever manner. The arm unit 200 may be connected at the end in the horizontal direction of the display displaying unit 300. A cantilever structure may be obtained by connecting the upper end of the arm unit 200 near the center in the horizontal direction of the display displaying unit 300, and connecting the lower end to the end of the body stand unit 100 as shown in FIGS. 1A and 1B.

A backlight is necessary in the case of a liquid crystal display, and thus the thickness of the display displaying unit becomes thicker and the weight becomes heavier. In particular, considering usage for a display of displaying television pictures rather than for a computer display, greater number of backlights is arranged than in the computer display to ensure image quality as a television receiver. In addition to backlights, an inverter for controlling the backlight is also necessary in the liquid crystal display. Thus, in the case of the liquid crystal display, the weight is heavier and the rigidity of the displaying unit including the arm unit is greatly enhanced to support the display displaying unit in a cantilever manner, whereby the structure becomes complicating and the weight becomes heavier. Therefore, it is not realistic to support the liquid crystal display in a cantilever manner in view of convenience of the user, manufacturing cost, and the like.

The organic EL panel is made up of organic EL elements, which are self-emitting elements, and thus does not require backlights and configuration members such as an inverter related thereto, and can be configured light only with the panel made of thin-plate glass. Therefore, according to the present embodiment, the display displaying unit 300 itself can be configured to a very light weight, and the display displaying unit 300 can be supported in a cantilever manner.

The display displaying unit 300 is turnable in the direction of an arrow A1 in FIG. 2 with the coupling part with respect to the arm unit 200 as the center, and the user can set a tilt position of the display displaying unit 300 to a desired angle.

In the display panel of the related art, the member for supporting the display panel supports the central part in the transverse direction of the display panel from the lower side in the case of one-point support. In the case of two-point support, the vicinity of both ends in the transverse direction of the display panel is supported from the lower side. In the present embodiment, the arm unit 200 is arranged shifted from the central part in the transverse direction of the display displaying unit 300 and the display displaying unit 300 is supported in a cantilever manner, and thus the arm unit 200 is out of the view of the user, and the user can independently recognize only the display screen 300a. The user can get an impression as if the display displaying unit 300 is floating on the body stand unit 100 without the arm unit 200. The user then can independently and closely look only at the display screen 300a by supporting the display displaying unit 300 in a cantilever manner.

The degree of freedom in installing the arm unit 200 enhances since there is no need to connect the root of the arm unit 200 to the central part of the body stand unit 100. Thus, the installing position of the arm unit 200 with respect to the body stand unit 100 can be determined in view of the arrangement etc. of the internal structure of the body stand unit 100 and the substrate, and the degree of freedom of design can be enhanced. The configuring members can be arranged in the most efficient manner in view of the internal structure of the body stand unit 100, and the size of the display device 1000 can be suppressed to a minimum. Furthermore, since the arm unit 200 is not arranged at the central part of the body stand unit 100, a wide effective space can be created at the upper surface of the body stand unit 100, and the display part, the operation button, the LED display lamp etc. can be freely arranged on the upper surface of the body stand unit 100.

As shown in FIGS. 1A, 1B, and 2, the arm unit 200 is arranged inclined towards the back surface of the display displaying unit 300 from the rear side of the body stand unit 100. In FIG. 2, an inclination angle θ of the arm unit 200 with respect to a perpendicular direction is about 45 to 60°. When the display displaying unit 300 is viewed from the front surface, the arm unit 200 will be hidden behind the display displaying unit 300, thereby suppressing the arm unit 200 from being recognized in the view of the user. Therefore, the arm unit 200 can be reliably suppressed from being recognized in the view of the user according to the synergetic effect of arranging the arm unit 200 in a shifted manner from the central part of the display displaying unit 300.

The connection state of the display displaying unit 300 and the body stand unit 100 is suppressed from being directly recognized by the user since only the display displaying unit 300 and the body stand unit 100 appear in the view of the user and the arm unit 200 barely comes into view. The user thus feel as if the display displaying unit 300 is floating in space.

In the configuration of the present embodiment, the lightness of the display displaying unit 300 is emphasized and recognized by the user since the thickness of the display displaying unit 300 is very thin or about a few mm. Therefore, for the user, the display displaying unit 300 excelling in floating feeling and lightness is provided by the synergetic effect with the feeling as if the display displaying unit 300 is floating in space.

The user then can closely look at only the display content of the display displaying unit 300, which is recognized as if floating in space, and can concentrate on the display content without being distracted by other structures. A display device 1000 in which a satisfactory designability can be maintained while creating a feeling the display screen 300a is floating to the user, and in which the visibility of the display screen 300a is greatly enhanced can be provided.

[Configuration of Arm Unit]

Figure 3:
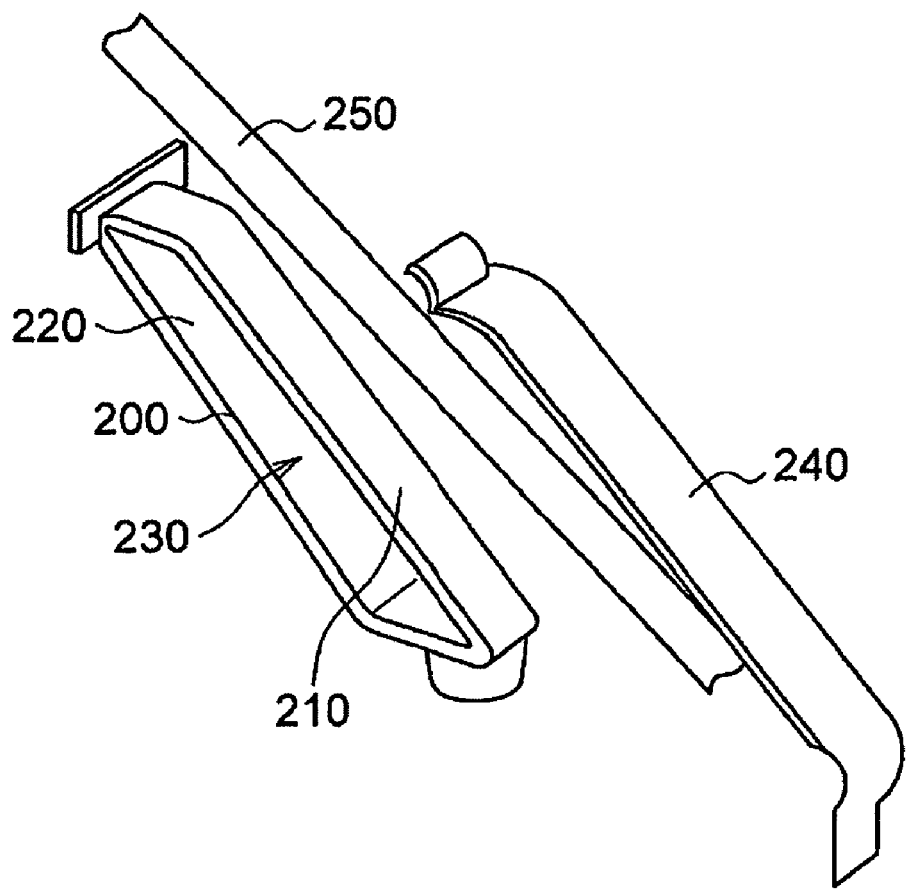
FIG. 3 is a frame format view showing a configuration of an arm unit.

FIG. 3 is a frame format view showing a configuration of the arm unit 200. As shown in FIG. 3, an opening 230 passing through the side face is formed in the arm unit 200 along the longitudinal direction thereof to have a hollow structure. According to such hollow structure, the arm unit 200 is configured by a first arm unit 210 positioned on the upper part, and a second arm unit 220 positioned on the lower part. The first arm unit 210 and the second arm unit 220 are configured to a thin flat plate shape and are arranged facing each other with the opening 230 interposed in between, and the thickness of the first arm unit 210 and the second arm unit 220 are suppressed to a minimum.

As described above, the display displaying unit 300 is very thin and is configured to excel in lightness and floating feeling. Therefore, with respect to the arm unit 200 for supporting the display displaying unit 300, a configuration excelling in lightness and floating feeling is obtained similar to the display displaying unit 300 by suppressing the thickness to a minimum with the hollow structure, and lightness and floating feeling can be emphasized for the display device 1000 as a whole.

Since the weight of the liquid crystal display is heavy, it is difficult, to have the arm unit as a hollow structure to obtain lightness and airiness in order to ensure strength. In the present embodiment, the necessary strength can be ensured even if the arm unit 200 has a hollow structure since the display displaying unit 300 is configured by the organic EL panel 320. Therefore, the display displaying unit 300 can be reliably supported, and a satisfactory designability excelling In lightness and airiness can be ensured.

A cover 240 is placed over the upper surface of the first arm unit 210. A flexible print substrate 250 for electrically connecting the body stand unit 100 and the display displaying unit 300 is incorporated between the upper surface of the first arm unit 210 and the cover 240.

FIGS. 4A to 4G are frame format views showing the configuration of the arm unit 200 in detail. FIG. 4A is a front view of the arm unit 200 seen from the front surface side of the display displaying unit 300, FIG. 4B is a left side view, FIG. 4C is a right side view, FIG. 4D is a top view, FIG. 4E is a bottom view, FIG. 4F is a rear view, and FIG. 4G is a cross sectional view taken along a chain dashed line I-I' in FIG. 4C. The body of the arm unit 200 with the cover 240 detached can be configured as an integrated block through casting or machining with metal such as aluminum as the raw material.

Figure 5G:
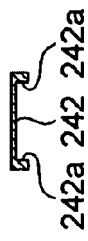
FIGS. 5A to 5G are frame format views showing a configuration of a cover of the arm unit in detail.
Figure 5C:
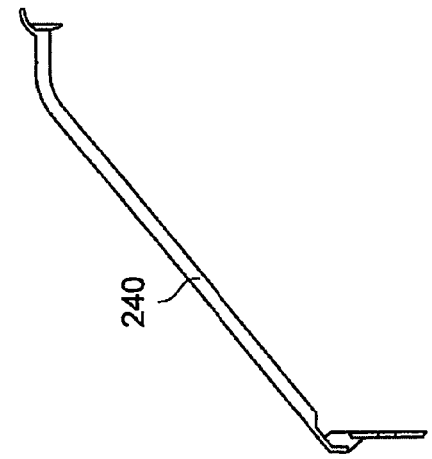
Figure 5A:
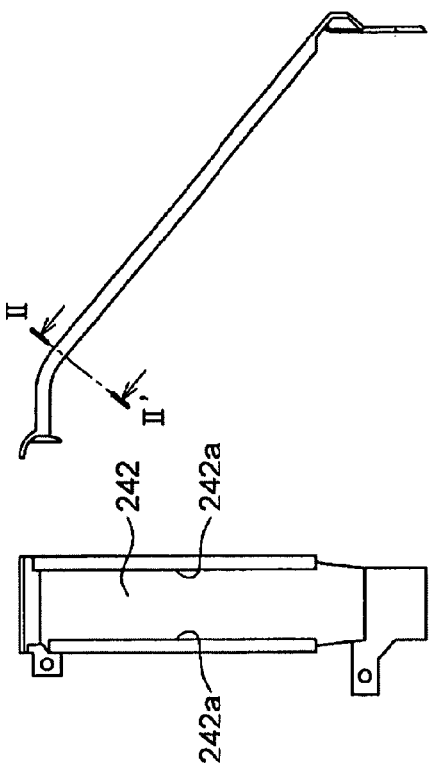
Figure 5D:
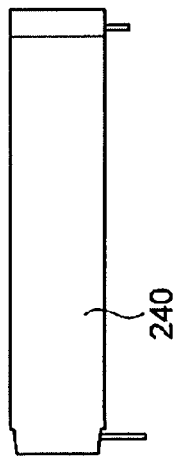
Figure 5B:
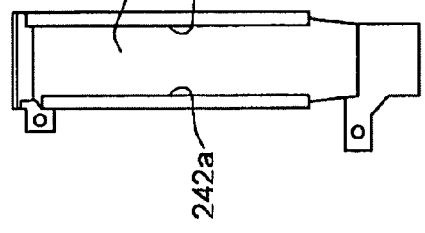
Figure 5E:
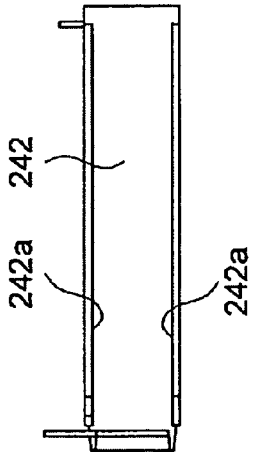
Figure 5F:
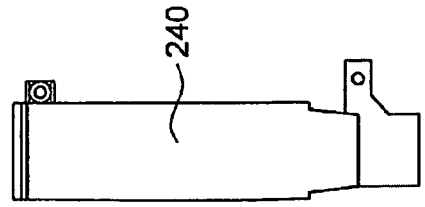

FIGS. 5A to 5G are frame format views showing a configuration of the cover 240 in detail. FIG. 5A is a front view of the cover 240 seen from the front surface side of the display displaying unit 300, FIG. 5B is a left side view, FIG. 5C is a right side view, FIG. 5D is a top view, FIG. 5E is a bottom view, FIG. 5F is a rear view, and FIG. 5G is a cross sectional view taken along a chain dashed line II-II' in FIG. 5C. As shown in FIGS. 5A to 5G, the cover includes a concave part 242, and sides walls 242a on both sides of the concave part 242 fit into the side faces in the width direction of the first arm unit 210. The flexible print substrate 250 is arranged between the first arm unit 210 and the cover 240 while being accommodated at the bottom of the concave part 242. The flexible print substrate 250 thus is not exposed to the outside.

The weight of the display displaying unit 300 can be suppressed to a minimum, and the necessary strength can be ensured even if the arm unit 200 has a hollow structure by configuring the display displaying unit 300 with the organic EL panel 320. The display displaying unit 300 configured to be light and thin is obtained, and floating feeling and airiness can be evoked on the user by having the arm unit 200 as a hollow structure and suppressing the volume of the arm unit 200 to a minimum. A structure that prevents the user from being aware of the existence of the wiring is obtained by incorporating the flexible print substrate 250 in the first arm unit 210.

[Configuration of Display Displaying Unit]

Figure 6:
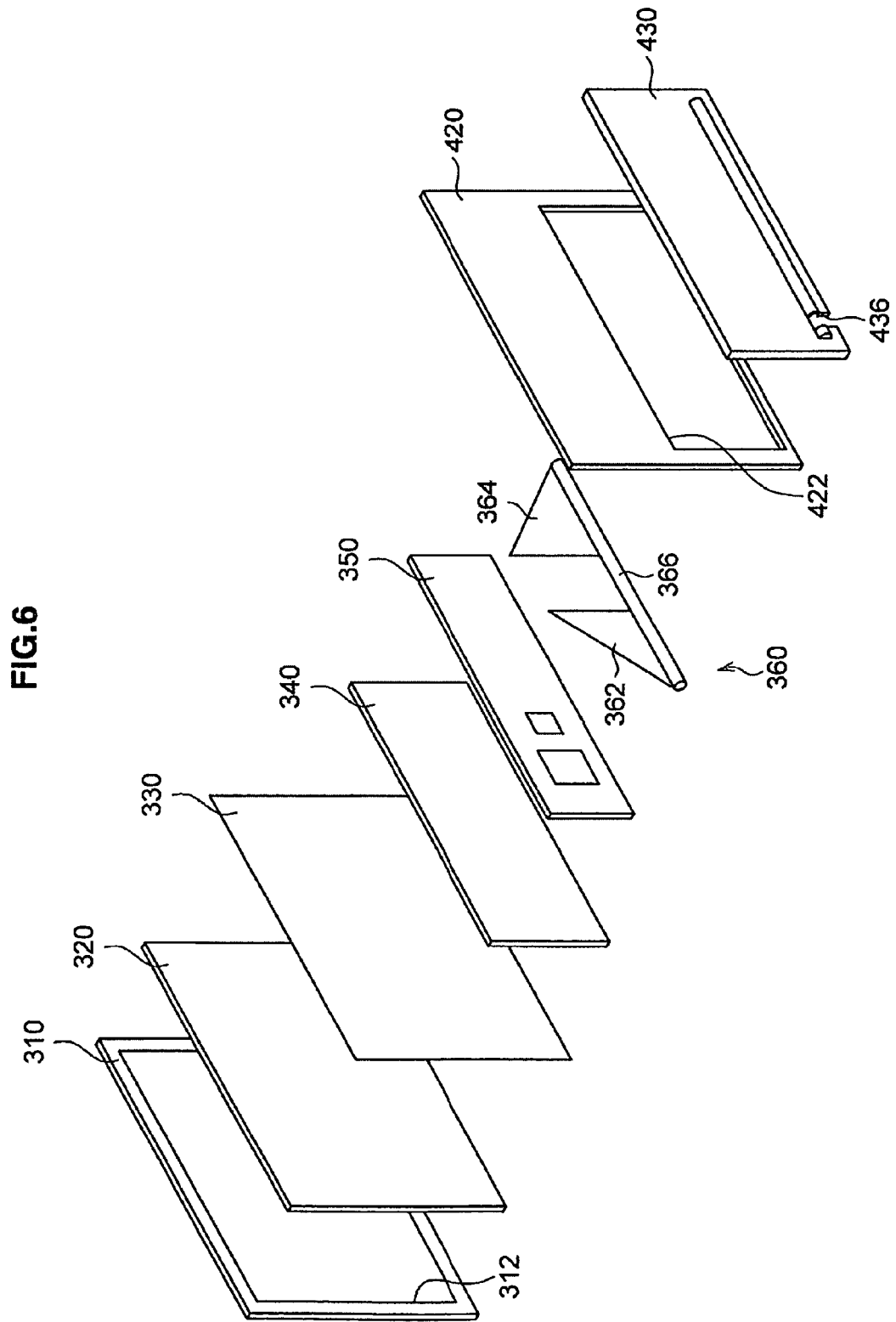
FIG. 6 is an exploded perspective view showing a configuration of a display displaying unit.

FIG. 6 is a frame format view showing a configuration of the display displaying unit 300, and shows an exploded perspective view of the display displaying unit 300. As shown in FIG. 6, the display displaying unit 300 is configured to include a bezel 310, the organic EL panel 320, a graphite sheet 330, a base plate 340, a T-substrate 350, a hinge 360, a rear cover 420, and a T-cover 430.

The base plate 340 is a member that constitutes the main frame of the display displaying unit 300, where the arm unit 200 is coupled to the base plate 340 by way of the hinge 360. The main configuring members such as the organic EL panel 320, the T-substrate 350, and the hinge 360 are fixed with respect to the base plate 340. The main members configuring the display displaying unit 300 such as the organic EL panel 320, the T-substrate 350, the hinge 360, the rear cover 420, and the T-cover 430 are all attached with the base plate 340 as a reference.

The graphite sheet 330 is attached to the back surface of the organic EL panel 320. The organic EL panel 320 is fixed to the base plate 340 through adhesive tape with the surface attached with the graphite sheet 330 facing the base plate 340.

The T-substrate 350 is made of hard substrate, and is connected with the power supply line and the signal line connecting with the organic EL panel 320. The size of the T-substrate 350 corresponds to the size of the base plate 340, and the T-substrate 350 is fixed on the side opposite to the surface fixed with the organic EL panel 320 with respect to the base plate 340.

The hinge 360 is a configuring member for coupling the arm unit 200 and the base plate 340. The hinge 360 is configured to include configuring members such as a first hinge plate 362 and a second hinge plate 364 made of metal and having a triangular plan shape, a shaft 366 made of metal, and the like. The shaft 366 is arranged horizontally along the lower end of the display displaying unit 300. The first hinge plate 362 and the second hinge plate 364 are fixed with respect to the base plate 340, and are turnably attached with respect to the shaft 366. The shaft 366 is fixed with respect to the arm unit 200. Therefore, the base plate 340 can turn with respect to the shaft 366 fixed to the arm unit 200, in which case the center axis of rotation becomes the center axis of the shaft 366. Thus, the display displaying unit 300 can be turned in the direction of the arrow A1 in FIG. 2, and the tilt angle of the display displaying unit 300 can be varied.

The bezel 310 is a member that is attached at the edge of the organic EL panel 320, and that constitutes the outer appearance of the edge of the display displaying unit 300. The rear cover 420 and the T-cover 430 are metal covers that cover the back surface of the display displaying unit 300. The rear cover 420 has an opening 422 formed at a portion corresponding to the position of the T-substrate 350 and the hinge 360, and mainly covers the upper part of the back surface of the display displaying unit 300. The T-cover 430 is configured to be attached in correspondence to the position of the opening 422 so as to cover the T-substrate 350 and the hinge 360.

The base plate 340, the T-substrate 350, and the hinge 360 are all arranged only at the region of less than half of the lower side of the display displaying unit 300, and the area occupied by the base plate 340, the T-substrate 350, and the hinge 360 with respect to the area of the entire display displaying unit 300 is suppressed to a minimum. Other than the region arranged with the base plate 340, the T-substrate 350, and the hinge 360, only three members of mainly the organic EL panel 320, the graphite sheet 330, and the rear cover 420 define the thickness of the display displaying unit 300. Therefore, in the region including the upper half of the display displaying unit 300, in particular, the thickness of the display displaying unit 300 can be very thin, and the thickness can be suppressed to about 3 mm, as described above.

Since the display device 1000 is normally placed on the table etc., the user rarely sees the display displaying unit 300 from the lower side, and the thickness of the display displaying unit 300 is recognized from the upper side. Therefore, the thinness of the display displaying unit 300 can be emphasized to the user by arranging the members such as the base plate 340, the T-substrate 350, and the hinge 360 on the lower side of the display displaying unit 300, and suppressing the thickness on the upper side of the display displaying unit 300 to a minimum. Therefore, a satisfactory designability can be maintained while creating a floating feeling and airiness as described above.

Figure 7A:
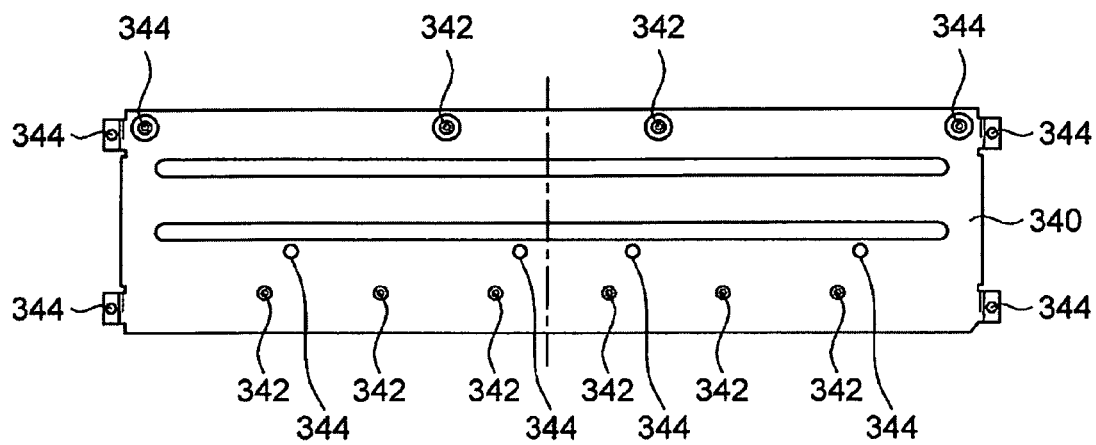
FIGS. 7A to 7C are plan views showing a configuration of a base plate.
Figure 7B:
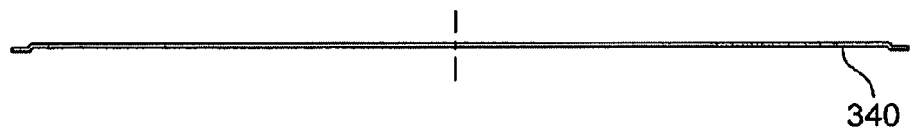
Figure 7C:
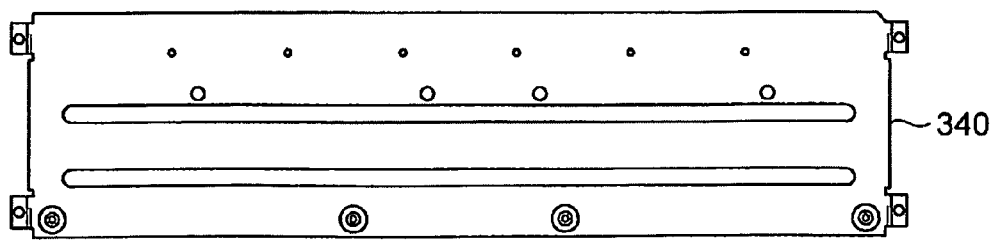

FIGS. 7A to 7C are plan views showing a configuration of the base plate 340. FIG. 7A is a front view of the base plate 340 seen from the rear surface side of the display displaying unit 300, FIG. 7B is a bottom view of FIG. 7A, and FIG. 7C is rear view of FIG. 7A. The base plate 340 is configured from a press molded metal plate. As shown in FIGS. 7A to 7C, a plurality of screw holes 342, 344 is formed in the base plate 340. The screw hole 342 is used to fix the first hinge plate 362 and the second hinge plate 364. The other screw hole 344 is used to fixe components of the display displaying unit 300 such as the T-substrate 350 and the T-cover 430.

The bezel 310 is fixed to the periphery of the organic EL panel 320 through adhesion. As shown in FIG. 6, an opening 312 for exposing the display screen 300a of the organic EL panel 320 is formed in the bezel 310.

FIGS. 8A and 8B are frame format views showing a configuration of the rear cover 420. FIG. 8A is a front view of the rear cover 420 seen from the front surface side of the display displaying unit 300, and FIG. 8B is a rear view of the rear cover 420 seen from the rear surface side of the display displaying unit 300.

FIGS. 9A to 9G are frame format views showing a configuration of the T-cover 430. FIG. 9A is a front view of the T-cover 430 seen from the front surface side of the display displaying unit 300, FIG. 9B is a left side view, FIG. 9C is a right side view, FIG. 9D is a top view, FIG. 9E is a bottom view, FIG. 9F is a rear view, and FIG. 9G is a cross sectional view taken along a chain dashed line III-III' in FIG. 9A.

As shown in FIGS. 8A and 8B, an opening 422 is formed in the rear cover 420 in correspondence to the position of the base plate 340, the T-substrate 350, and the hinge 360. A pass-through hole 424 for inserting the screw to fix the rear cover 420 is formed in the rear cover 420. The rear cover 420 is fixed with respect to the bezel 310, as described later, to cover the upper part of the rear surface side of the organic EL panel 320.

FIG. 10 shows a state of the display device 1000 seen from the rear surface side with the T-cover 430 detached. The base plate 340, the T-substrate 350, and the hinge 360 are arranged in the region on the lower side of the display displaying unit 300, where the T-substrate 350 and the hinge 360 are exposed to the outside from the opening 422 of the rear cover 420 with the T-cover 430 detached.

As shown in FIGS. 9A to 9G, the T-cover 430 includes a concave part 432 corresponding to the shaft 366 of the hinge 360, and a concave part 434 corresponding to a region arranged with the base plate 340, the T-substrate 350, the first hinge plate 362, and the second hinge plate 364. A cutout 436 is formed in the T-cover 430 at a position corresponding to the arm unit 200.

When the T-cover 430 is placed over the rear cover 420, the shaft 366 is accommodated in the concave part 432, and the T-substrate 350, the first hinge plate 362, and the second hinge plate 364 are accommodated in the concave part 434. Thus, the configuring members such as the T-substrate 350 and the hinge 360 are covered with the T-cover 430, as shown in FIG. 1B. The arm unit 200 is projected towards the back side from the cutout 436 of the T-cover 430.

Therefore, only the rear cover 420, the T-cover 430, and the arm unit 200 are exposed to the outside at the rear surface side of the display displaying unit 300, and a very simple and sophisticated outer appearance can be obtained. In particular, the display displaying unit 300 that is very thin and that has a floating feeling and lightness can be configured since the configuring members related to thickness at the upper side of the display displaying unit 300 are mainly three members of the organic EL panel 320, the graphic sheet 330, and the rear cover 420. The display displaying unit 300 having sufficient strength while being very thin can be configured since the base plate 340 is a rigid member of the display displaying unit 300 and the main components of the display displaying unit 300 are fixed with respect to the base plate 340.

[Configuration of Body Stand Unit]

Figure 11:
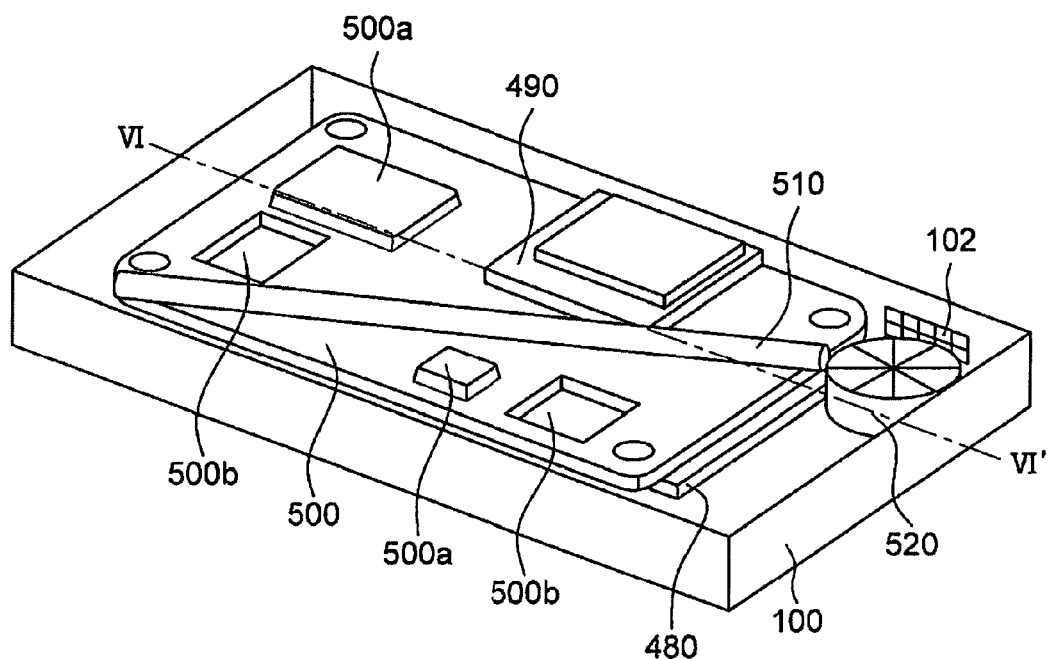
FIG. 11 is an exploded perspective view showing a schematic configuration of the body stand unit.

FIG. 11 is an exploded perspective view showing a schematic configuration of the body stand unit 100, showing a state in which the cover on the upper surface of the body stand unit 100 is detached. The housing of the body stand unit 100 is made of metal. A circuit substrate (O substrate) 480 for performing signal processing to drive the display displaying unit 300, a circuit substrate (B-CAS substrate) 490, a cooling fan 520, a radiator plate (heat, spreader) 500, and the like are compactly incorporated inside the body stand unit 100. Various terminals such as tuner for satellite broadcast (BS, CS), ground digital wave etc., LAN, HDMI, USB, and the like are incorporated in the body stand unit 100, and a rod antenna 104 (see FIG. 1B) for receiving the ground digital wave is arranged on the back surface side. A speaker box, an operation button, and the like are also incorporated in the body stand unit 100.

Figure 12:
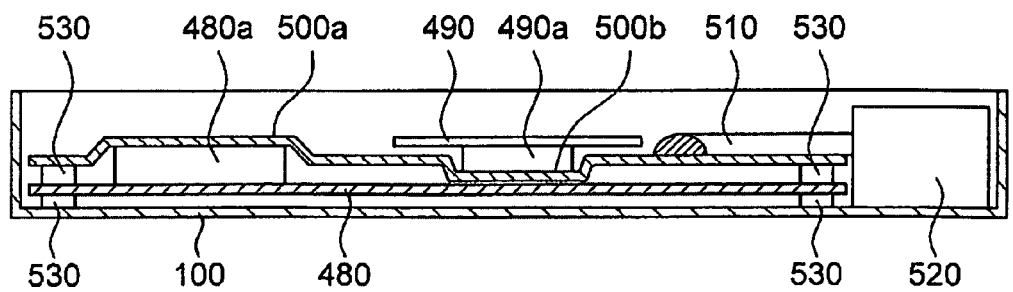
FIG. 12 is a frame format view showing a cross section taken along a chain dashed line VI-VI' in FIG. 11.

FIG. 12 is a frame format view showing a cross section taken along a chain dashed line VI-VI' in FIG. 11, showing a position relationship between the circuit substrates 480, 490 and the radiator plate 500. A plurality of electronic components 480a is mounted on the circuit substrate 480. One or a plurality of electronic components 490a is mounted on the circuit substrate 490.

The radiator plate 500 has a rectangular shape corresponding to the shape of the body stand unit 100, and is made from a press molded metal plate. The radiator plate 500 extends over a wide range including a region not mounted with the electronic components 480a at inside the body stand unit 100.

The radiator plate 500 includes a plurality of convex surfaces 500a and concave surfaces 500b arranged corresponding to the positions of the electronic components 480a, 490a mounted on the circuit substrates 480, 490, and the electronic components 480a, 490a mounted on the circuit substrates 480, 490 contact the radiator plate 500 at the positions of the convex surfaces 500a or the concave surfaces 500b. The height and the depth of the convex surfaces 500a and the concave surface 500b correspond to the plurality of electronic components 480a having different heights from the surface of the circuit substrate 480, where the plurality of electronic components 480a having different heights contact the radiator plate 500 when the radiator plate 500 is attached to the circuit substrate 480. Similarly, the height and the depth of the convex surface 500a and the concave surface 500b correspond to the height of the electronic component 490a mounted on the circuit substrate 490. The radiator plate 500 may directly contact the electronic components 480a, 490a, or may indirectly contact the electronic components 480a, 490a by way of a heat conductive sheet (heat radiation sheet) such as silicon rubber.

The radiator plate 500 is integrally configured with the cooling fan 520 to configure a cooling unit with the cooling fan 520.

The cooling fan 520 is configured from a centrifugal fan, and exhausts air taken in from the top and the bottom from the side surface. An intake port (not shown) for taking in outside air is formed in the body stand unit 100 at the lower part of the cooling fan 520. The air taken in from the intake port through rotation of the cooling fan 520 is exhausted to the outside from the opening 102 formed at the back surface of the body stand unit 100.

As shown in FIG. 11, a heat pipe 510 extending from one corner of the radiator plate 500 towards the cooling fan 520 is arranged on the upper surface of the radiator plate 500. The heat pipe 510 is configured from a copper pipe, copper rod, and the like, and is fixed on the upper surface of the radiator plate 500 through welding. The heat pipe 510 is linearly arranged so as to pass through positions not formed with the convex surface 500a and the concave surface 500b of the radiator plate 500. According to such configuration, the heat pipe 510 can be configured in a straight line, and the manufacturing cost can be reduced.

As shown in FIG. 12, the upper surface of the electronic component 480a arranged on the circuit substrate 480 contacts the radiator plate 500 at the position of the convex surface 500a of the radiator plate 500. The lower surface of the chip 490a arranged on the circuit substrate 490 contacts the radiator plate 500 at the position of the concave surface 500b of the radiator plate 500. In this case, each electronic component 480a, 480b and the radiator plate 500 are contacted through the heat radiation sheet, so that the heat from each electronic component 480a, 480b can be efficiently transmitted to the radiator plate 500 and then diffused.

The heat transmitted to the radiator plate 500 is guided to the cooling fan 520 from the heat pipe 510 of the radiator plate 500. Therefore, the heat generated in the electronic component 480a, 480b of the circuit substrate 480, 490 can be heat transferred along the heat pipe 510, and released outward from the cooling fan 520.

A joint part 530 is arranged between the radiator plate 500 and the circuit substrate 480. The joint part 530 is also arranged between the body stand unit 100 and the circuit substrate 480. If the joint part 530 is made of conductive material, the ground line of the circuit substrate 480, and the body stand unit 100 and the radiator plate 500 are connected so that the radiator plate 500 is grounded. According to such configuration, heat radiation is performed by the radiator plate 500, and the radiator plate 500 can be grounded, whereby the influence of noise on the circuit substrates 480, 490 can be reliably suppressed, and the reliability can be enhanced.

Figure 13:
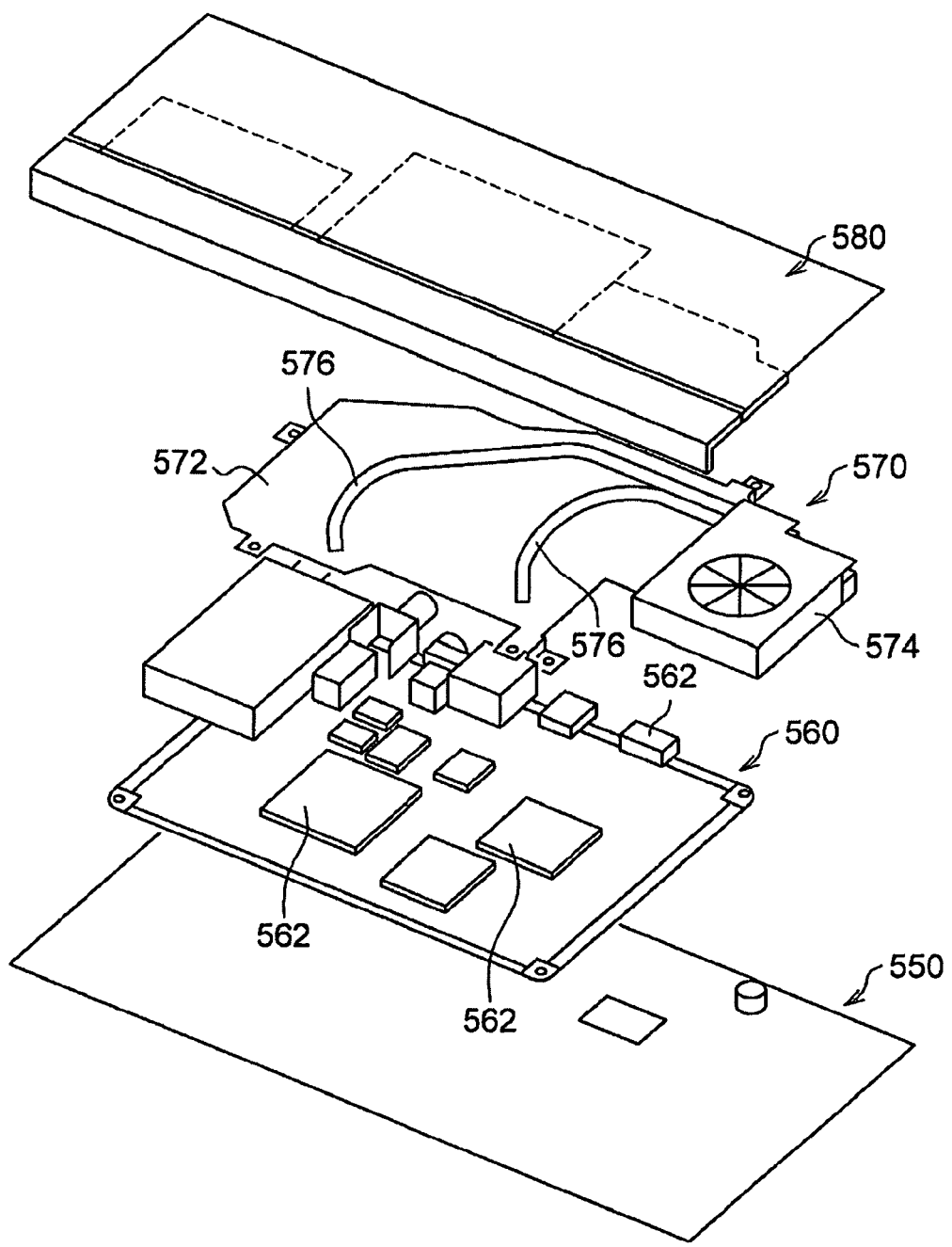
FIG. 13 is an exploded perspective view showing in detail another example of an inner configuration of the body stand unit.

FIG. 13 is an exploded perspective view showing in detail another example of an inner configuration of the body stand unit 100. As shown in FIG. 13, a bottom cover 550, a main substrate 560, a cooling unit 570, and a top cover block 580 are arranged in order from the lower side in the body stand unit 100.

Figure 14:
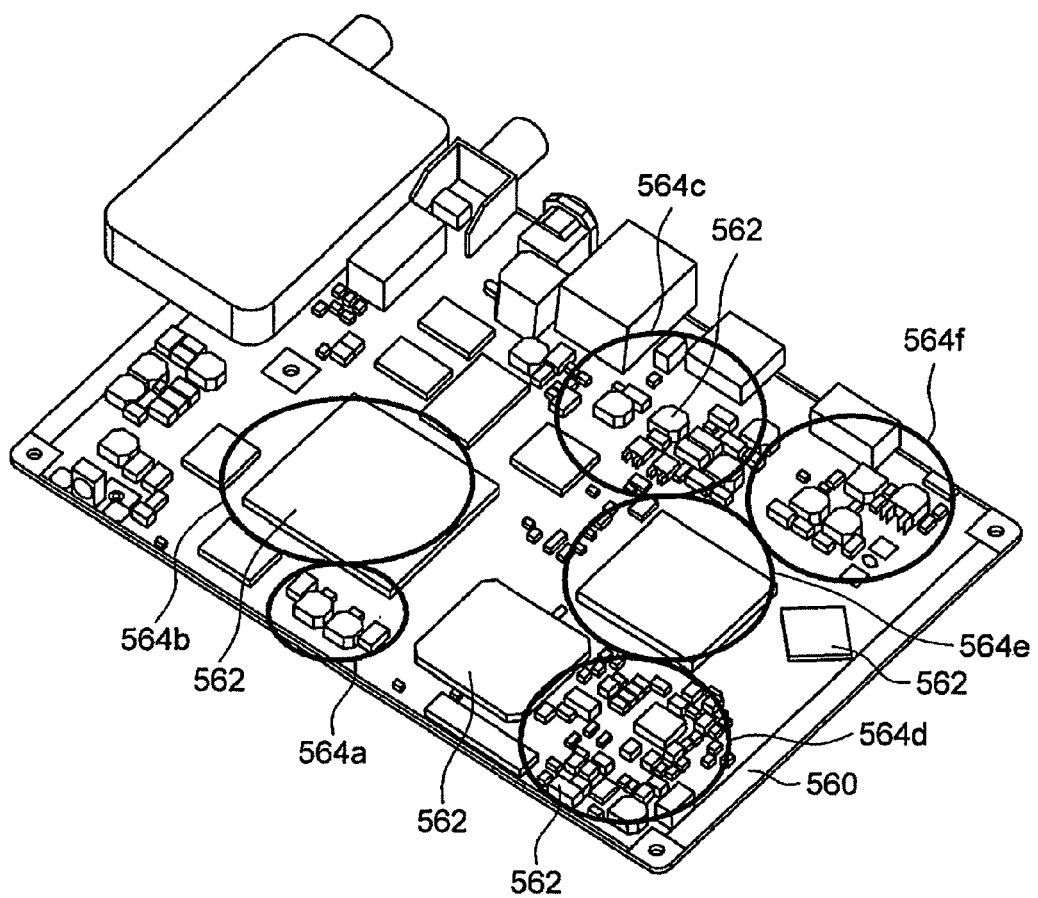
FIG. 14 is a perspective view showing an upper surface of a main substrate shown in FIG. 13.

FIG. 14 is a perspective view showing an upper surface of the main substrate 560. A great number of electronic components 562 are arranged on the upper surface of the main substrate 560. Six regions 564a, 564b, 564c, 564d, 564e, and 564f shown in FIG. 14 are regions where the heat divergence from the electronic components 562 is particularly large.

Figure 15:
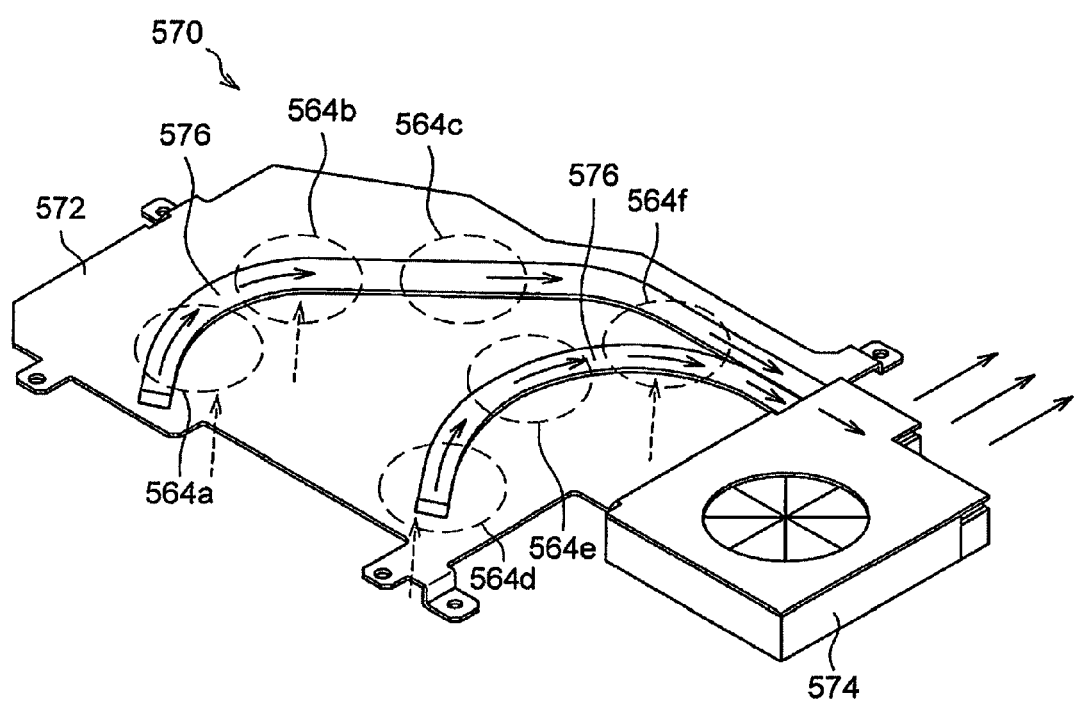
FIG. 15 is a frame format view showing a cooling unit arranged on the main substrate.

FIG. 15 shows the cooling unit 570 arranged on the main substrate 560. Similar to the example of FIG. 11, the cooling unit 570 is integrally configured with a radiator plate 572 and a cooling fan 574.

FIG. 15 shows the positions of the regions 564a to 564f in FIG. 14 in correspondence to the upper surface of the radiator plate 572. As shown in FIG. 15, two heat pipes 576 are arranged at positions corresponding to the regions 564a to 564f, where the ends of the heat pipes 576 are connected to the cooling fan 574. Similar to the cooling fan 520 of FIG. 11, the cooling fan 574 is configured from a centrifugal fan, and exhausts the air taken in from the top and the bottom from the side and exhausts the air to the outside of the body stand unit 100.

According to the above configuration, the heat generated in the electronic components 562 is transmitted to the heat pipes 576, and sent to the cooling fan 574 through the heat pipes 576 since the heat pipes 576 are arranged so as to pass through the regions 564a to 564f having large heat divergence on the main substrate 560. Therefore, the main heat generated in the main substrate 560 can be efficiently sent to the cooling fan 574, and the heat inside the body stand unit 100 can be efficiently released outward.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising a body unit; a display unit; and a supporting unit, the body unit comprising:
   a circuit substrate;
   electronic components on the circuit substrate;
   a radiator plate facing the circuit substrate, the radiator plate contacting at least one of the electronic components, the radiator plate having a top, a bottom, and at least one side;
   a heat pipe contacting the radiator plate along a majority length of the heat pipe and thermally connecting the radiator plate to a cooling fan, and
   the cooling fan located at a terminating end of the heat pipe, the cooling fan adjacent to the at least one side of the radiator plate;
   wherein the radiator plate, the heat pipe, and the cooling fan form an integrated cooling unit,
   wherein a portion of the heat generated by the electronic components is transferred from the radiator plate to the cooling fan via the heat pipe.

2. The display device according to claim 1, wherein the radiator plate includes a plurality of concave surfaces and convex surfaces, accommodating varying heights of the electronic components.

3. The display device according to claim 2, wherein the heat pipe contacts the region of the radiator plate without concave or convex surface.

4. The display device according to claim 1, wherein the body unit includes at least two circuit substrates, and the radiator plate is arranged between the at least two circuit substrates, contacting the electronic components on the at least two circuit substrates.

5. The display device according to claim 1, wherein the radiator plate is grounded.

6. The display device according to claim 5, further including at least one joint part electrically connecting the radiator plate to the circuit substrate.

7. The display device according to claim 1, wherein:
   the radiator plate includes areas of higher relative temperature corresponding to locations of the electronic components, and areas of lower relative temperature corresponding to locations between the electronic components; and
   the heat pipe contacts the areas of higher relative temperature.

8. The display device according to claim 1, wherein the radiator plate contacts the electronic components via a heat conductive sheet.

9. The display device according to claim 1, wherein the heat pipe contacts the radiator plate along an entire length of the heat pipe.

10. The display device according to claim 1, wherein the heat pipe extends in a single direction along its entire length.

11. The display device according to claim 1, wherein the heat pipe is located between concave and convex surfaces of the radiator plate.

* * * * *